United States Patent [19]
Desrochers

[11] Patent Number: 6,105,979
[45] Date of Patent: Aug. 22, 2000

[54] SKI FOR SNOWMOBILE

[76] Inventor: Pierre Desrochers, 1071, des Patriotes Nord, St-Hilaire, Quebec, Canada, J3H 2B2

[21] Appl. No.: 09/152,392

[22] Filed: Sep. 14, 1998

Related U.S. Application Data

[63] Continuation of application No. 08/429,424, Apr. 25, 1995, abandoned.

[51] Int. Cl.⁷ .................................................. B62M 27/02
[52] U.S. Cl. .............................................................. 280/28
[58] Field of Search .................................. 280/28, 28.14, 280/28.16, 21.1, 22, 22.1; 180/182

[56] References Cited

U.S. PATENT DOCUMENTS

| | | | |
|---|---|---|---|
| 3,190,671 | 6/1965 | Fahris | 280/28 |
| 3,817,544 | 6/1974 | Labelle | 280/28 |
| 5,443,278 | 8/1995 | Berto | 280/28 |

OTHER PUBLICATIONS

Catalogue d'Accessoires Arctic Cat, 1992, p. 56, Arctco, Inc., Thief River Falls, MN 56701, U.S.A.

*Primary Examiner*—Richard M. Camby
*Attorney, Agent, or Firm*—Eric Fincham

[57] ABSTRACT

The invention provides an improved ski for a snow vehicle such as a snowmobile, the ski having a snow contacting surface thereof which has a greater width proximate the front portion of the ski compared to a width rearwardly thereof. The snow contacting surface may be a portion of the keel or the ski itself although preferably both utilize this arrangement. An adaptor for converting existing skis to this configuration is also disclosed. Better directional stability is imparted to the snow vehicle using this type of ski.

10 Claims, 2 Drawing Sheets

SKI FOR SNOWMOBILE

This is a continuation of application Ser. No. 08/429,424 filed Apr. 25, 1995 now abandoned.

BACKGROUND OF THE INVENTION

The present invention relates to a ski suitable for a snow vehicle.

The use of snowmobiles and like vehicles has become very popular over the past number of years. These vehicles are used both for utilitarian purposes and for sport/recreation. The vehicles are adapted for travel across snow and/or ice and usually include one or more skis along with a driven belt or track for propulsion purposes.

The sport and recreational use of snowmobiles is widely practiced on trails and soft snow which have been prepared i.e. groomed. While snowmobiles are generally controllable by use of weight transfer and a front ski is "steerable", they are not always the most maneuverable of vehicles. To date, little attention has been paid to this facet of snowmobile control; it has generally been accepted that little could be done.

One of the major problems occurs on packed surfaces wherein the snowmobile will tend to "zig zag". This lack of directional stability cannot be somewhat disconcerting for all drivers and particularly for the novice user.

SUMMARY OF THE INVENTION

It is therefore an object of the present invention to provide an improved ski for a vehicle having skis adapted to ride on snow and wherein the ski will provide better directional stability.

It is a further object of the present invention to provide an improved ski for a snowmobile wherein the ski will prevent the tendency to zig zag under certain types of snow conditions.

It is a further object of the present invention to provide a kit to modify existing skis to overcome directional stability problems.

According to one aspect of the present invention, there is provided an improvement in a ski for use with a snow vehicle wherein the ski has a front and a tail and wherein the ski has a snow contacting surface, there is provided the improvement wherein the snow contacting surface has a width proximate the front which is greater than a width of the snow contacting surface rearwardly thereof.

In a further aspect of the present invention, there is provided a ski for a snow vehicle, the ski comprising a longitudinally extending member having a front portion, a tail portion, and a front tip portion adjacent the front portion, a sole portion, and a keel portion extending downwardly from the sole portion. At least one of the sole portion and keel portion has a configuration whereby a snow contacting portion thereof has a greater width proximate the front ski portion compared to a width rearwardly thereof.

In a still further aspect of the present invention, there is provided a ski for a snow vehicle wherein the ski comprises a longitudinally extending member having a front portion, a tail portion, and a front tip portion adjacent the front portion and having a sole on the bottom of the ski. The sole is defined by a pair of side walls and which side walls taper inwardly from the front portion to the tail portion such that the ski has a greater width proximate the front portion compared to a ski width rearwardly thereof.

In a further aspect, there is provided an adaptor for a snow vehicle ski, the adaptor being designed to fit on the bottom of the ski, the adaptor comprising a longitudinally extending member having a snow contacting surface and which snow contacting surface has a greater width at one end than at an opposed end thereof.

In greater detail, as mentioned above, in one aspect of the present invention, there is provided an improved ski which is suitable for use on a snowmobile and other vehicles.

A conventional structure for a ski used for snow vehicles is one wherein the ski has an upturned tip and a generally longitudinally extending body. The body has a bottom surface on which there may be provided one or more structures. Conventionally, skis for snow vehicles are provided with a keel structure and in some instances, there may be provided a wear bar on the bottom surface of the keel.

According to the present invention, there is one member or body structure associated with the ski having a snow contacting surface which is configured to provide greater directional stability. This is achieved by having the snow contacting surface with a greater width at a portion near the front of the ski compared to a portion which is rearwardly thereof.

The snow contacting surface may be associated with the sole of the ski or the keel or even the wear bar. While the use of only one of the snow contacting surfaces associated with the above members will assist, it is preferred that at least two of the members have the desired configuration and in particular, that the sole of the ski and the keel utilize such an arrangement.

In the case of the ski itself, a convenient manner of achieving the above may be to have a tapered configuration wherein the front or shovel of the ski has a greater width and then the sides taper inwardly as they extend to the tail of the ski. A similar arrangement can also be used for both the keel and the wear bar if so desired.

It will be understood that the degree of difference between the widths may vary and indeed, irregular configurations could be utilized, all of which would be within the scope of the present invention.

The present invention also provides an adaptor which can be utilized to transform existing skis into skis having the advantages conferred by the present invention. Most snowmobile skis utilize a keel arrangement and to this end, there is provided an adaptor which is designed to fit over the keel of the existing ski. As such, the adaptor becomes a new keel and which adaptor has the desired configuration. Naturally, if one so desired, one could also utilize an adaptor which would fit over the entire ski and impart the advantages of the present invention thereto. Similarly, one could utilize a wear bar adaptor which would also have the desired configuration. The adaptor may conveniently be formed of a suitable metallic material.

Having thus generally described the invention, reference will be made to the accompanying drawings illustrating an embodiment thereof, in which:

DETAILED DESCRIPTION OF THE INVENTION

Figure 1:
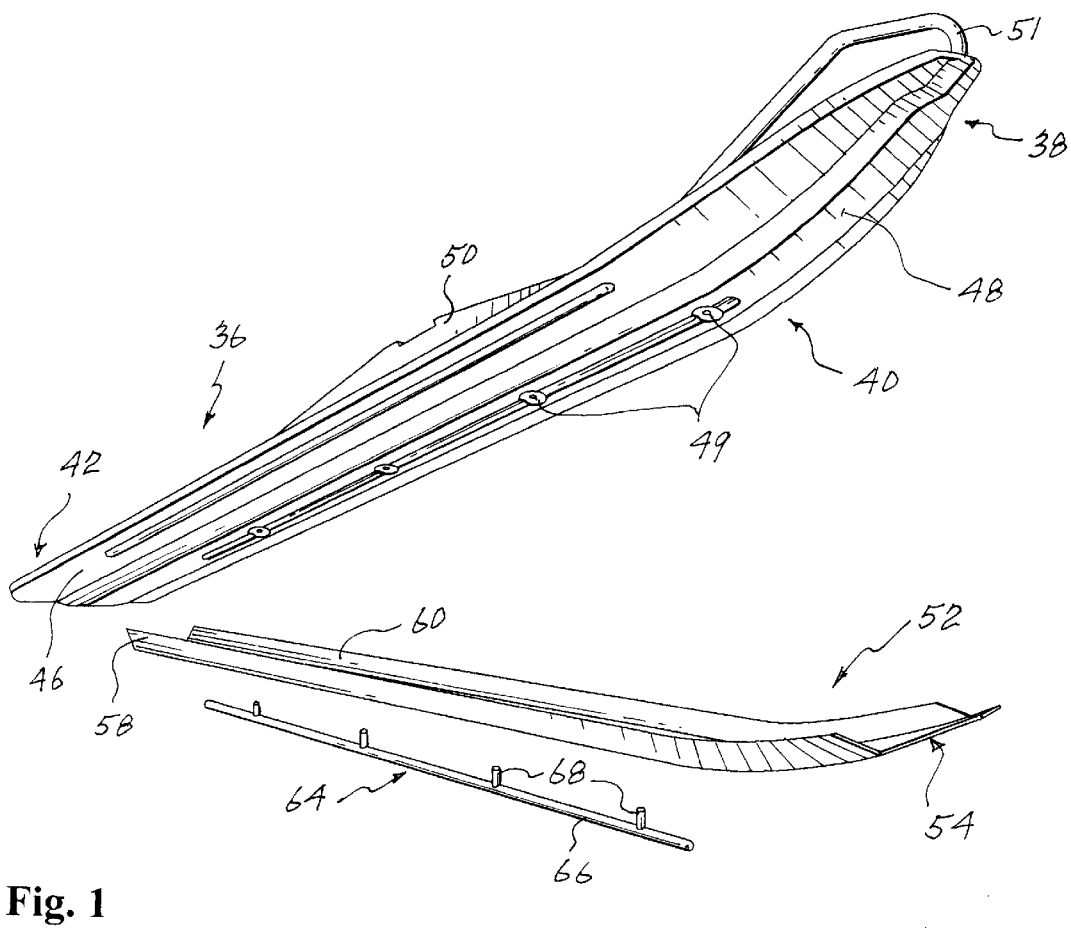
FIG. 1 is an exploded view of a ski and adaptor kit therefor.

Referring to the drawings in greater detail and by reference characters thereto, the embodiment of FIGS. 6 to 9 illustrate an original equipment ski embodying the improvements of the present invention.

Ski 10, as is conventional, includes an upturned tip section generally designated by reference numeral 12, a tail area generally designated by reference numeral 14, and a front portion or area generally designated by reference numeral 15.

Ski 10 includes an upper surface 16 and a lower surface or sole 18. Extending downwardly from sole 18 is a keel 20. A wear bar 22 is mounted on the bottom of keel 20.

As is conventional with snowmobile skis, a pair of upwardly extending mounting flanges 24 and 26 may be utilized for connecting the ski to the snowmobile while bar 29 is provided at tip section 12.

Figure 7:
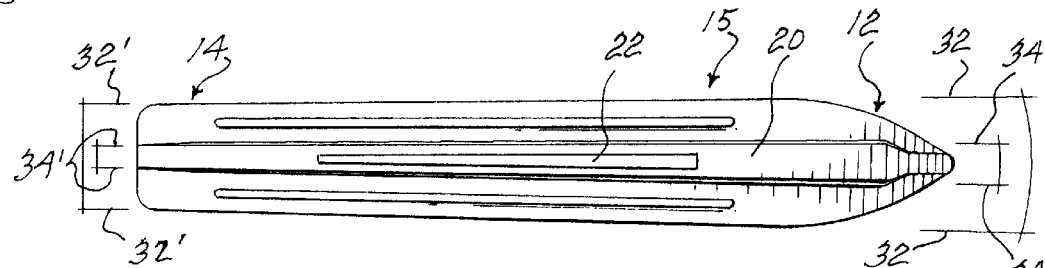
FIG. 7 is a bottom plan view thereof.
Figure 8:
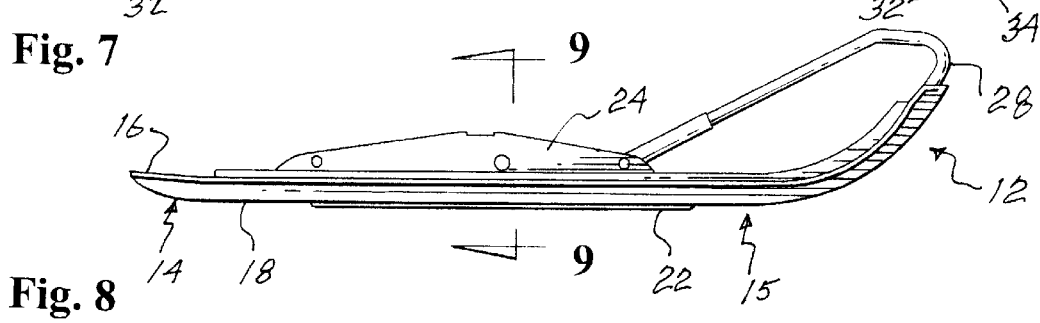
FIG. 8 is a side elevational view thereof.
Figure 9:
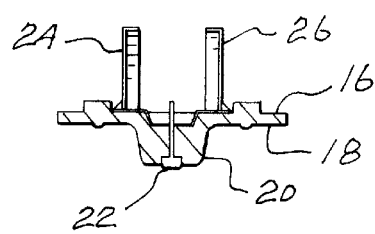
FIG. 9 is a sectional view taken along the lines 9—9 of FIG. 8.

It may best be seen in FIG. 7, the front portion 15 of ski 10 has a width which is generally designated by the distance between lines 32. Tail section 14, on the other hand, has a width designated by lines 32' and as will be noted, this width is less than the width between lines 32. In other words, the ski has a generally tapered configuration such that the front portion of the ski has a greater width. Similarly, lines 34 designated the width of keel 20 at the front portion 15 of ski 10 while lines 34' designate the width of keel 20 proximate tail section 14. Thus, both sole 18 and the snow contacting section of keel 20 have a decreasing width.

Figure 6:
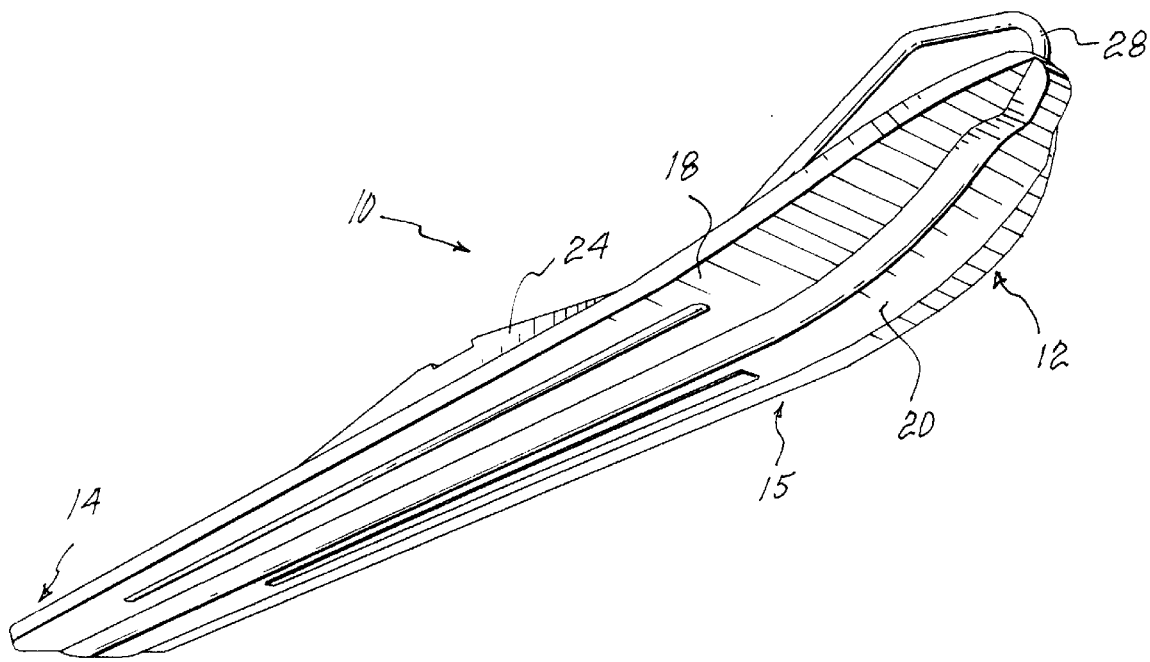
FIG. 6 is a perspective view of a ski embodying the improvements of the present invention.

As also may be seen in FIG. 6, wear bar 22 also has a width which decreases from the front rearwardly.

An adaptor for skis presently in use is illustrated in FIGS. 1 to 5 and will now be referred to. As shown in FIG. 1, there may be provided a conventional ski 36 which includes an upturned tip portion 38, a front section 40 and a tail section 42. Ski 36 has an upper surface 44 and a bottom surface or sole 46.

Ski 10 includes a conventional keel 48 which, in the illustrated embodiment, has a plurality of apertures 49 formed therein. As was the case with the embodiment of FIGS. 6 to 9, mounting flanges 50 (only one shown) and handle or bar 51 are provided.

There is provided an adaptor 52 and which adaptor 52 includes an upturned tip 54. Adaptor 52 includes a base 56 and a pair of upwardly extending side walls 58 and 60. A plurality of apertures/slots 62 are provided in base 66.

A wear bar/attaching member 64 comprises a longitudinally extending rod 66 having a plurality of upwardly extending studs 68. Studs 68 are provided with screw threads on their free end.

Figure 2:
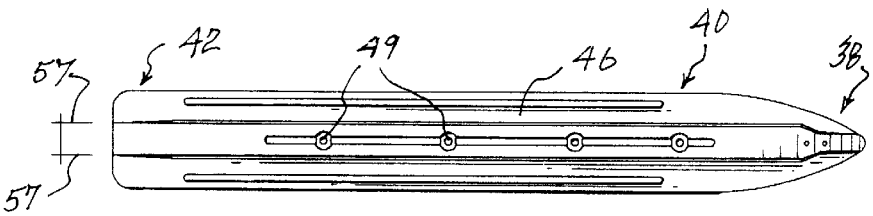
FIG. 2 is a bottom plan view of the ski of FIG. 1.
Figure 3:
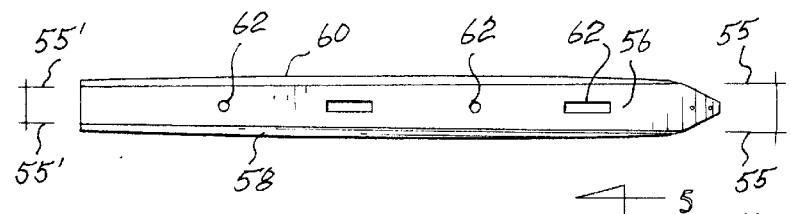
FIG. 3 is a bottom plan view of the adaptor.
Figure 5:
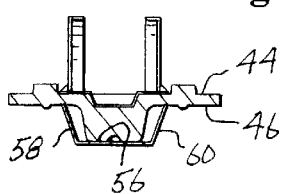
FIG. 5 is a sectional view taken along the lines 5—5 of FIG. 4.
Figure 4:
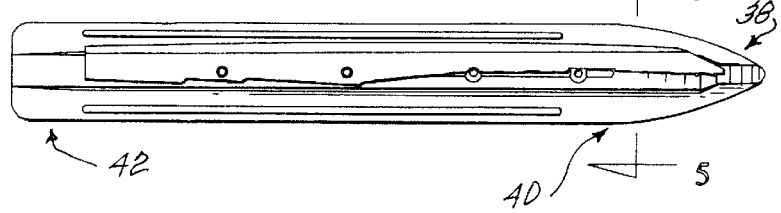
FIG. 4 is a bottom plan view, partially in cutaway, of the ski with the adaptor secured thereto.

As shown in FIGS. 2 and 3, adaptor/keel 52 has a width at its front end 40 as shown by the distance between lines 55 while at its tail end, it has a diminished width as indicated by lines 55'. The original keel 48 on ski 36 has a consistent width as indicated by lines 57 and which width is similar to that of tail 42 of adaptor 52.

To adapt conventional ski 36 for the present invention, adaptor/keel 52 is placed over keel 48 and wear bar 64 is placed such that studs 68 pass through apertures 62 in new keel 52 and apertures 49 and in old keel 48. Nuts may then be screw threadedly engaged with studs 68 to lock new keel 52 and wear bar 64 in position. In this respect, walls 58 and 60 are sized to extend upwardly and contact sole 46 of ski 36.

It will be understood that the above described embodiment is for purposes of illustration only and that changes and modifications may be made thereto without departing from the spirit and scope of the invention.

What is claimed is:

1. In a ski for a snow vehicle wherein the ski has a front and a tail and a bottom surface for contacting a snow surface, the improvement comprising a longitudinally extending member on said bottom surface, said longitudinally extending member having a width less than a width of said bottom surface, said longitudinally extending member having a width proximate said ski front which is greater than a width of said longitudinally extending member rearwardly thereof.

2. In a ski for a snow vehicle wherein the ski has a front and a tail and a bottom surface, the improvement comprising a longitudinally extending member on said bottom, surface, said longitudinally extending member having a width proximate said ski front which is greater than a width of said longitudinally extending member rearwardly thereof, and wherein said longitudinally extending member comprises a keel formed on said bottom surface of said ski.

3. In a ski for a snow vehicle wherein the ski has a front and a tail and a bottom surface, the improvement comprising a longitudinally extending member on said bottom surface, said longitudinally extending member having a width proximate said ski front which is greater than a width of said longitudinally extending member rearwardly thereof, and wherein said longitudinally extending member comprises a wear bar on said bottom surface of said ski.

4. The improvement of claim 3 wherein said snow vehicle is a snowmobile and said keel has an inwardly tapered configuration extending from said front to said tail such that a bottom surface of said keel has a decreasing width portion from said front to said tail.

5. A ski for a snow vehicle, said ski comprising a longitudinally extending member having a front portion, a tail portion, and a front tip portion adjacent said front portion, a sole portion, a keel portion extending downwardly from said sole portion, said keel portion having a configuration whereby a snow contacting portion thereof has a greater width proximate said front ski portion compared to a width rearwardly thereof.

6. The ski of claim 5 wherein both of said sole portions and said keel portions have a configuration whereby a bottom snow contacting surface there has a greater width proximate said front ski portion compared to a width rearwardly thereof.

7. The ski of claim 6 wherein each of said sole portion and said heel portion has a bottom surface thereof which tapers uniformly inwardly from said front portion to said tail portion.

8. An adaptor for a snow vehicle ski, said adaptor being designed to fit on a bottom of said ski, said adaptor comprising a longitudinally extending member having a snow contacting surface, said snow contacting surface having a greater width at one end than at an opposed end thereof, said snow contacting surface having a width less than a width of said snow vehicle ski.

9. An adaptor for a snow vehicle ski, said adaptor being designed to fit on a bottom of said ski, said adaptor comprising a longitudinally extending member having a snow contacting surface, said snow contacting surface having a greater width at one end than at an opposed end thereof, and wherein said member comprises a keel and further including means for securing said keel to said ski.

10. The adaptor of claim 9 wherein said means for securing said keel to said ski comprises a longitudinally extending member also functioning as a wear bar.

* * * * *